(12) United States Patent
Lingamneni

(10) Patent No.: US 10,397,306 B2
(45) Date of Patent: Aug. 27, 2019

(54) SYSTEM AND METHOD FOR TRANSLATING VERSIONED DATA SERVICE REQUESTS AND RESPONSES

(71) Applicant: American Express Travel Related Services Co., Inc., New York, NY (US)

(72) Inventor: Krishna Lingamneni, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 278 days.

(21) Appl. No.: 14/978,092

(22) Filed: Dec. 22, 2015

(65) Prior Publication Data

US 2017/0177682 A1    Jun. 22, 2017

(51) Int. Cl.
*G06F 16/25* (2019.01)
*H04L 29/08* (2006.01)

(52) U.S. Cl.
CPC ............ *H04L 67/06* (2013.01); *G06F 16/252* (2019.01); *H04L 67/02* (2013.01); *H04L 67/10* (2013.01); *H04L 67/2823* (2013.01)

(58) Field of Classification Search
CPC ... H04L 67/02; H04L 67/06; G06F 17/30864; G06F 17/30876; G06F 16/252
USPC ......... 726/23, 4, 24, 27, 7; 705/36 R, 14.54, 705/16, 2, 26.62, 3, 313, 39, 7.15, 7.22; 715/234, 229, 255, 762; 707/706, 763, 707/728, 743, 751, 756, 769
See application file for complete search history.

(56) References Cited

U.S. PATENT DOCUMENTS

| | | | | |
|---|---|---|---|---|
| 7,844,675 B2* | 11/2010 | Daigle | ............. | G06F 17/30861 709/206 |
| 8,938,414 B1* | 1/2015 | Kolesnikov | ....... | G06F 17/30312 707/602 |
| 2003/0005105 A1* | 1/2003 | Robb | ................. | H04L 12/2869 709/223 |
| 2011/0173168 A1* | 7/2011 | Jones | ................. | G06F 17/3092 707/695 |
| 2014/0344340 A1* | 11/2014 | Tang | ................... | H04L 67/2823 709/203 |

* cited by examiner

*Primary Examiner* — Jay A Morrison
*Assistant Examiner* — Ken Hoang
(74) *Attorney, Agent, or Firm* — Snell & Wilmer L.L.P.

(57) ABSTRACT

A system for translating versioned data service requests and responses is provided. A service request for data may have multiple different versions, with each version requesting different types of data. The system may be configured to translate a service request having a versioned format into a service request having a baseline format. The system may execute the service request in the baseline format to generate a service request response, containing the data requested. The system may also be configured to translate the service request response from a baseline response format back into the versioned data service response format of the original request.

20 Claims, 8 Drawing Sheets

SYSTEM AND METHOD FOR TRANSLATING VERSIONED DATA SERVICE REQUESTS AND RESPONSES

FIELD

The present disclosure generally relates to accessing and requesting data, and more specifically, to systems and methods for versioning data service requests.

BACKGROUND

The rise of big data has created increased complexity and a greater need for consumers to request and interact with the data. Consumers may request data from a service provider using a data service request. Different consumers may request different and/or additional sources of data for different service requests. Therefore, data service requests may be versioned to accommodate the different consumer requests. Separate versions of data service requests may each have different parameters for the requests, and different parameters for the service data response. In order to service each separate version of the data service requests, a separate service module is typically stored for each separate version. Separate service modules are often individually maintained, drastically increasing testing costs, coding costs, and development costs. As such, there is an increased need for systems and methods to centralize separate versions of data services requests into a single service module.

SUMMARY

In various embodiments, systems, methods, and articles of manufacture (collectively, the "system") for translating versioned data service requests and responses is provided. The system may comprise receiving a service request by a processor in electronic communication with a service version database. The service request may comprise a service version request format, a service version response format, and a data entry. The system may compare the service version request format to a baseline request format. The system may reformat the service request into the baseline request format. The system may retrieve the data entry from the service version database and generate a service request response. The service request response may comprise the data reply. The service request response may be formatted into a baseline response format.

In various embodiments, the system may comprise comparing the baseline response format to the service version response format. The system may comprise reformatting the service request response into the service version response format and sending the service request response.

In various embodiments, the service version request format may comprise a group ID, and the baseline request format may comprise a group ID. The system may compare the service version request format to the baseline request format by comparing the group IDs of the service version request format to the group IDs of the baseline request format. The system may determine whether the service version request format comprises group IDs that the baseline request format does not comprise. The system may reformat the service request into the baseline request format by adding and/or removing group IDs to the service version request format. The system may add and/or remove the group IDs that are contained in the baseline request format, but not the service version request format.

In various embodiments, the service version response format may comprise a group ID, and the baseline response format may comprise a group ID. The system may compare the service version response format to the baseline response format by comparing the group IDs of the service version response format to the group IDs of the baseline response format. The system may determine whether the service version response format comprises group IDs that the baseline response format does not comprise.

In various embodiments, the system may reformat the service request response into the service version response format by adding and/or removing group IDs from the baseline response format. The system may add and/or remove the group IDs that are contained in the baseline response format, but not the service version response format. The service request response may comprise only the group IDs of the service version response format, after the reformatting is completed.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may process any versioned service request by translating the service request into a baseline request format, before executing the service request. The system may also provide a service request response in any version, by translating the service request response from the baseline version into the specified service version, prior to sending out the service request response. The system may enable a service provider to provide multiple versions of a baseline reply message, as well as cater to multiple version request layouts. The system may also insulate a service requestor from any change that the service provider implements to provide additional information to one or more of the service requestors. In this regard, the system is a transformation of a distributed computer system of the prior art, into a new business tool allowing different versioned service requests to be serviced by a single service module.

Figure 1:
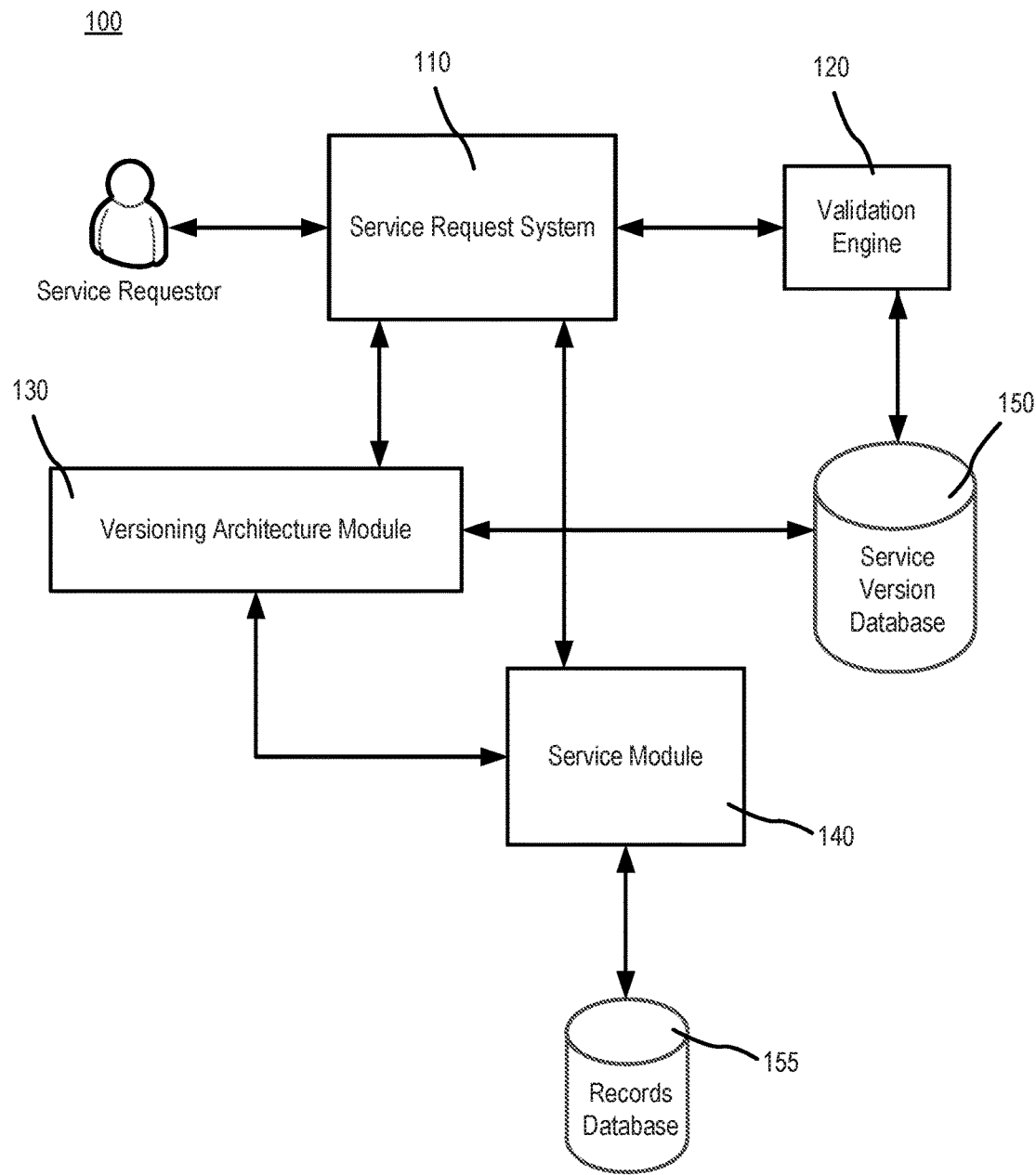
FIG. 1 is a block diagram illustrating various system components of a system for translating data service requests and responses, in accordance with various embodiments.

In various embodiments, and with reference to FIG. 1, system 100 may comprise a service request system 110, a validation engine 120, a versioning architecture module 130, a service module 140, a service version database 150, and a records database 155. Service request system 110 may be configured as a central hub to receive service requests and/or send service request responses. Service request system 110 may be configured to receive, parse, analyze and/or transmit data. Service request system 110 may comprise any suitable type of processor and/or system capable of receiving, parsing, analyzing, and/or transmitting data. Service request system 110 may receive a service request from the service requestor. The service requestor may comprise any entity requesting data from service request system 110. For example, the service requestor may be a consumer requesting data from a banking infrastructure. Service request system 110 may be in electronic and/or operative communication with validation engine 120, versioning architecture module 130, and/or service module 140. Service request system 110 may be in electronic and/or operative communication using any suitable method discussed herein or known in the art.

In various embodiments, the service request may be configured as a mechanism for requesting data. The service request may comprise a service version request format, a service version response format, and/or a data entry. The service version request format may specify the version and/or format that the service request is sent as, and the data entry requested. The service version request format may comprise several group IDs, with each group ID comprising a data entry. A group ID may comprise any suitable type of data grouping. A data entry may comprise data relating to the group ID. For example, a group ID may comprise "customer data." The data entry may then comprise data relating to "customer data." For example, data entry 1 may comprise "last name", data entry 2 may comprise "first name", data entry 3 may comprise "address", etc.

As an example, the service version request may be in version 5, and the service version request format may comprise requesting two groups of data (e.g., group 1 and group 2), with group 1 comprising two data requests (e.g., data entry 1 and data entry 2), and group 2 comprising three data requests (e.g., data entry 3, data entry 4, and data entry 5). As a further example, the service version request may be in version 3, and the service version request format may comprise requesting one group of data (e.g., group 1), with group 1 comprising two data requests (e.g., data entry 1 and data entry 2). The service version request may comprise any service version request format, and the service version request format may comprise any suitable types of data groups and data entries. In various embodiments, the service version request format may comprise a baseline request format. The baseline request format may comprise the current version of the service request running on service module 140.

In various embodiments, the service version response format may specify the format that the service request response is to be sent back as. For example, the service version request may be in version 5, and the service version response format may comprise two groups of data (e.g., group 1 and group 2), with group 1 comprising two data requests (e.g., data entry 1 and data entry 2), and group 2 comprising three data requests (e.g., data entry 3, data entry 4, and data entry 5). As a further example, the service version request may be in version 3, and the service version response format may comprise one group of data (e.g., group 1), with group 1 comprising two data requests (e.g., data entry 1 and data entry 2). The service version request may comprise any service version response format, and the service version response format may comprise any suitable types of data groups and data entries. In various embodiments, the service version response format may comprise the same version and/or format as the service version request format. In various embodiments, the service version response format may comprise the same format and/or version as a baseline response format. The baseline response format may comprise the current version of the service request running on service module 140.

In various embodiments, validation engine 120 may be configured to communicate with service request system 110 to validate the version that the service request is sent in. In this regard, validation engine 120 may be configured to compare the service version request format and the service version response format against the baseline request format and the baseline response format, respectively. Validation engine 120 may operatively communicate with service version database 150 to retrieve the baseline request format and the baseline response format. For example, the baseline request format may comprise Group1, having data entry 1 and data entry 2, and Group2, having data entry 3, data entry 4, and data entry 5. The baseline response format may comprise the same format as baseline request format, or may comprise a different format (e.g., Group1, having data entry 1 and data entry 2, Group2, having data entry 3, data entry 4, and data entry 5, and a Group3, having data entry 6).

Validation engine 120 may compare the service version request format and the service version response format against the baseline request format and the baseline response format. This comparison may allow validation engine 120 to determine whether the service request is in the most current version. In various embodiments, validation engine 120 may compare the formats by comparing the group IDs present in each, to determine what group IDs are missing and/or different from each format. Validation engine 120 may also compare the formats by comparing a version ID in each format. The service version request format, the service version response format, the baseline request format, and the baseline response format may each further comprise a version ID, such as a two byte number, indicating the version of the format. For example, the baseline response format may comprise the version ID of "03" and the service version response format may comprise the version ID of "02." In regard, validation engine 120 may compare the two version IDs and detect that the service version response format was not in the baseline response format. Validation engine 120 may operatively communicate with service request system 110 the response to the comparison, and the baseline request format and the baseline response format. Validation engine 120 may be in electronic and/or operative communication with service request system 110 and/or service version database 150. Validation engine 120 may be in electronic and/or operative communication using any suitable method discussed herein or known in the art.

In various embodiments, versioning architecture module 130 may be configured to translate service requests having a service version request format different from the baseline request format, and reformat the service request into the baseline request format. Versioning architecture module 130 may also be configured to translate the service request response having a service version response format different from the baseline response format, and reformat the service request response into the correct service version response format. Versioning architecture module 130 may be in electronic and/or operative communication with service request system 110, service version database 150, and/or service module 140. Versioning architecture module 130 may be in electronic and/or operative communication using any suitable method discussed herein or known in the art.

In various embodiments, service module 140 may be configured to receive the service request from service request system 110, and/or from versioning architecture module 130, and execute the service request. Service module 140 may execute the service request by operatively communicating with records database 155 to retrieve the data entry specified in the service request. Service module 140 may parse the data entry, and create the service request response containing the data entry. Service module 140 may be configured to generate the service request response after executing the service request. The service request response may be formatted into a baseline response format by service module 140. Service module 140 may operatively communicate the service request response to versioning architecture module 130 and/or service request system 110. Service module 140 may be in electronic and/or operative communication with service request system 110, versioning architecture module 130, and/or records database 155. Service module 140 may be in electronic and/or operative communication using any suitable method discussed herein or known in the art.

In various embodiments, service version database 150 may be configured to store the different versions and/or format for each type of service request and service request response. Service version database 150 may store a service version request format and a service version response format for each version. The stored entry for each service version request format and each service version response format may comprise information regarding the group IDs, the length of the group IDs, and how many times the group ID occurs in the service version request format and/or the service version response format. In various embodiments, the stored entry for each format may also comprise the version ID associated with the format. Service version database 150 may store the service version request format and the service version response format in any suitable form, and using any suitable technique. Service version database 150 may be in electronic and/or operative communication with service module 140. Service version database 150 may be in electronic and/or operative communication using any suitable method discussed herein or known in the art.

In various embodiments, the records database 155 may be configured to store data and records to be requested by the service requestor. Records database 155 may comprise any suitable data and records that may be requested by the service requestor. Records database 155 may comprise data relating to the data entry from the service request. Records database 155 may store the data and records in any format and/or suitable form, and using any suitable technique. Records database 155 may be in electronic and/or operative communication with service module 140. Records database 155 may be in electronic and/or operative communication using any suitable method discussed herein or known in the art.

Figure 2:
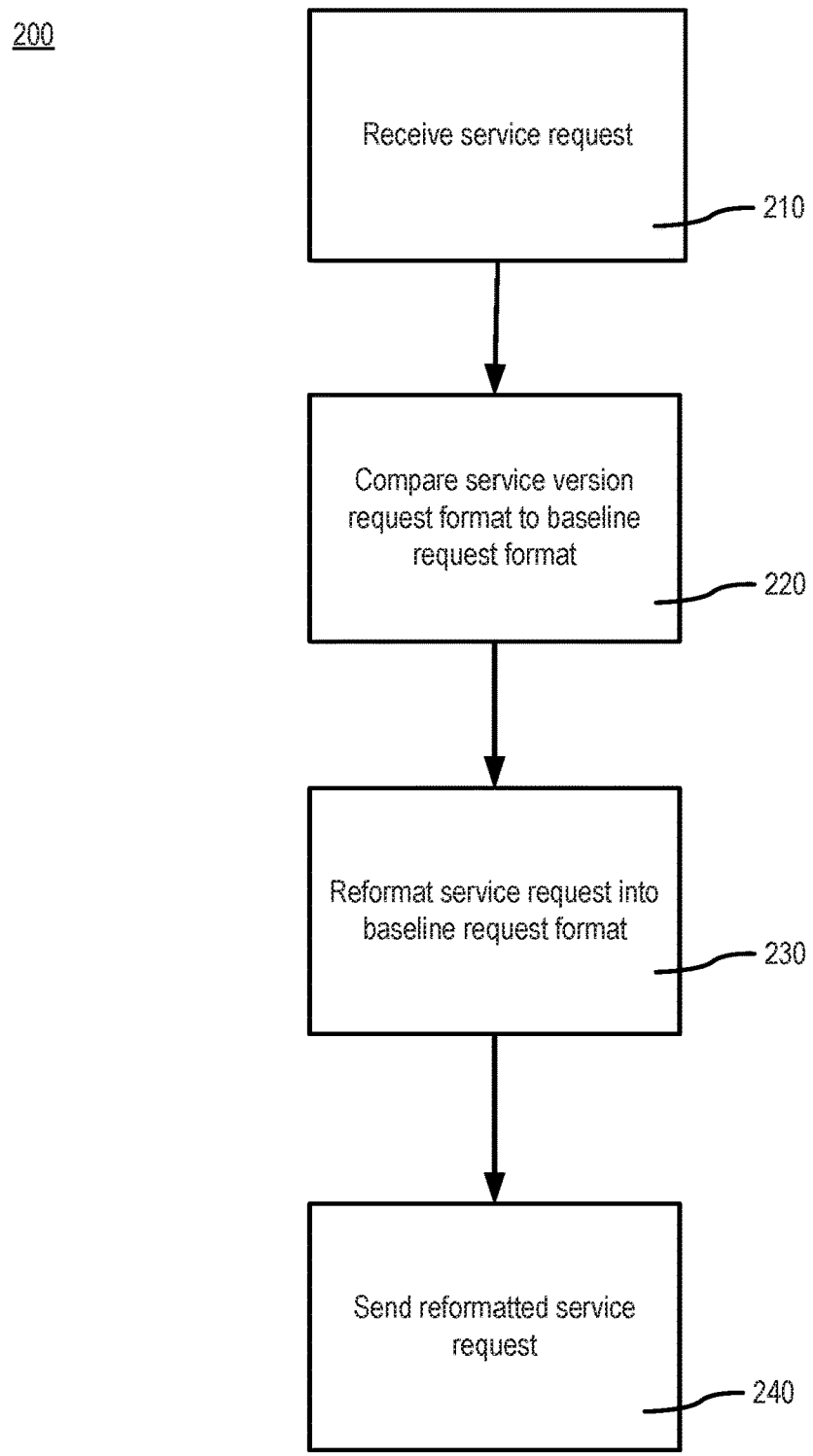
FIG. 2 illustrates a process flow for translating and reformatting a data service request, in accordance with various embodiments.

In various embodiments, and with reference to FIG. 2, a method 200 for translating a versioned service request is disclosed. Method 200 may comprise receiving a service request (Step 210). The service request may be sent by the service requestor. The service requestor may send the service request using any suitable method, such as, for example, through the use of a computer-based system. Service request system 110 may be configured to receive the service request. The service request may comprise a service version request format, a service version response format, and a data entry.

In various embodiments, method 200 may comprise comparing the service version request format to the baseline request format (Step 220). Service request system 110 may operatively communicate with validation engine 120 to determine whether the service request format is in an old version format, or the baseline request format. Validation engine 120 may receive from service request system 110 the service request. Validation engine 120 may operatively communicate with service version database 150 to determine what the baseline request format is for the service that is requested. Validation engine 120 may compare the baseline request format to the service version request format. Validation engine 120 may compare the baseline request format to the service version request format by comparing the version ID of each format. For example, the baseline request format may comprise the version ID of "07" and the service version request format may comprise the version ID of "04." In this regard, validation engine 120 may compare the two version IDs and detect that the service version request format was not in the baseline request format. In response to the formats matching, validation engine 120 may communicate to service request system 110 to proceed to contacting service module 140 to run the service request. In response to the formats not matching, validation engine 120 may communicate to service request system 110 to communicate with versioning architecture module 130 to reformat the service request.

In various embodiments, method 200 may comprise reformatting the service request into the baseline request format (step 230). The service request may be reformatted into the baseline request format by versioning architecture module 130. Versioning architecture module 130 may receive the service request from the service request system 110. Versioning architecture module 130 may receive the baseline request format from service version database 150. Versioning architecture module 130 may reformat the service request into the baseline request format.

In various embodiments, method 200 may comprise sending the reformatted service request (step 240). Versioning architecture module 130 may be configured to send the reformatted service request to service module 140. Service module 140 may be configured to receive the reformatted service request and execute the service request to generate the service request response.

Figure 3:
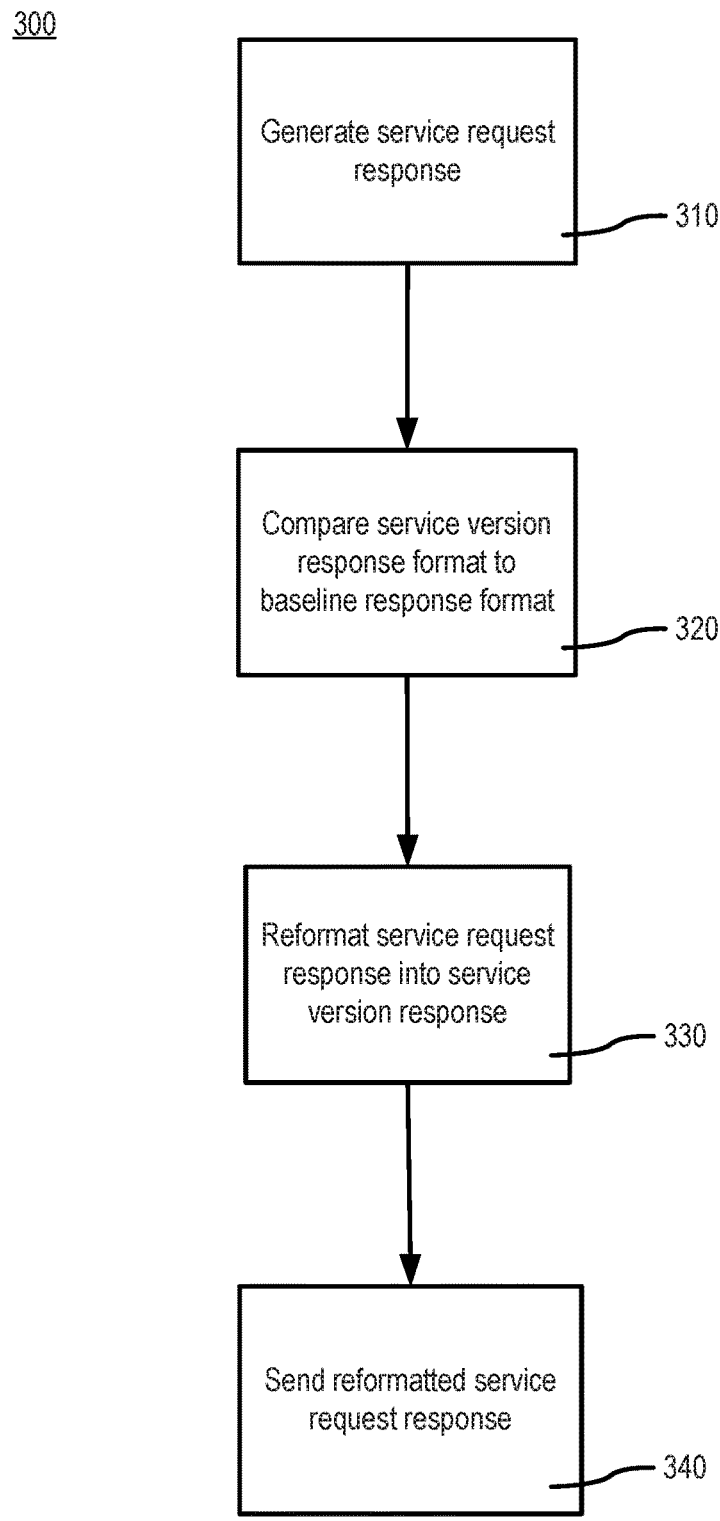
FIG. 3 illustrates a process flow for translating and reformatting a data service response, in accordance with various embodiments.

In various embodiments, and with reference to FIG. 3, a method 300 for translating a versioned service response is disclosed. Method 300 may comprise generating the service request response (step 310). Service module 140 may be configured to execute the service request to generate the service request response. Service module 140 may execute the service request to determine the data entries comprised in the service request. Service module 140 may operatively communicate with records database 155 to retrieve the applicable stored data entry. Service module 140 may generate the service request response by entering the data entries in the specified format of the baseline response format. The service request response may be generated to comprise the data entry and have the baseline response format. Service module 140 may transmit the service request response to versioning architecture module 130.

In various embodiments, method 300 may comprise comparing the service version response format to the baseline response format (step 320). Versioning architecture module 130 may operatively communicate with service version database 150 to retrieve the service request response format. Versioning architecture module 130 may compare the service request response format to the baseline response format. Versioning architecture module 130 may compare the two formats by comparing the group IDs in each to find differences. Versioning architecture module 130 may also compare the two formats by comparing the version ID in each, to determine whether the version ID's match or are different.

In various embodiments, method 300 may comprise reformatting the service request response into the service version response format (step 330). The service request response may be reformatted into the service version response format by versioning architecture module 130. Versioning architecture module 130 may receive the service request response from the service module 140. Versioning architecture module 130 may reformat the service request response into the service version response format. Versioning architecture module 130 may reformat the service request response by determining the group IDs in the service request response format, and reformatting the service request response to only contain those group IDs present in the service request response format. Versioning architecture module 130 may reformat the service request response by removing the appropriate group IDs and data entries that are not present in the service version response format (further illustrated in FIGS. 4A-4E).

In various embodiments, method 300 may comprise sending the reformatted service request response 340. Versioning architecture module 130 may transmit the service request response to service request system 110. Service request system 110 may be configured to display and/or transmit the service request response to the service requestor.

Figure 4A:
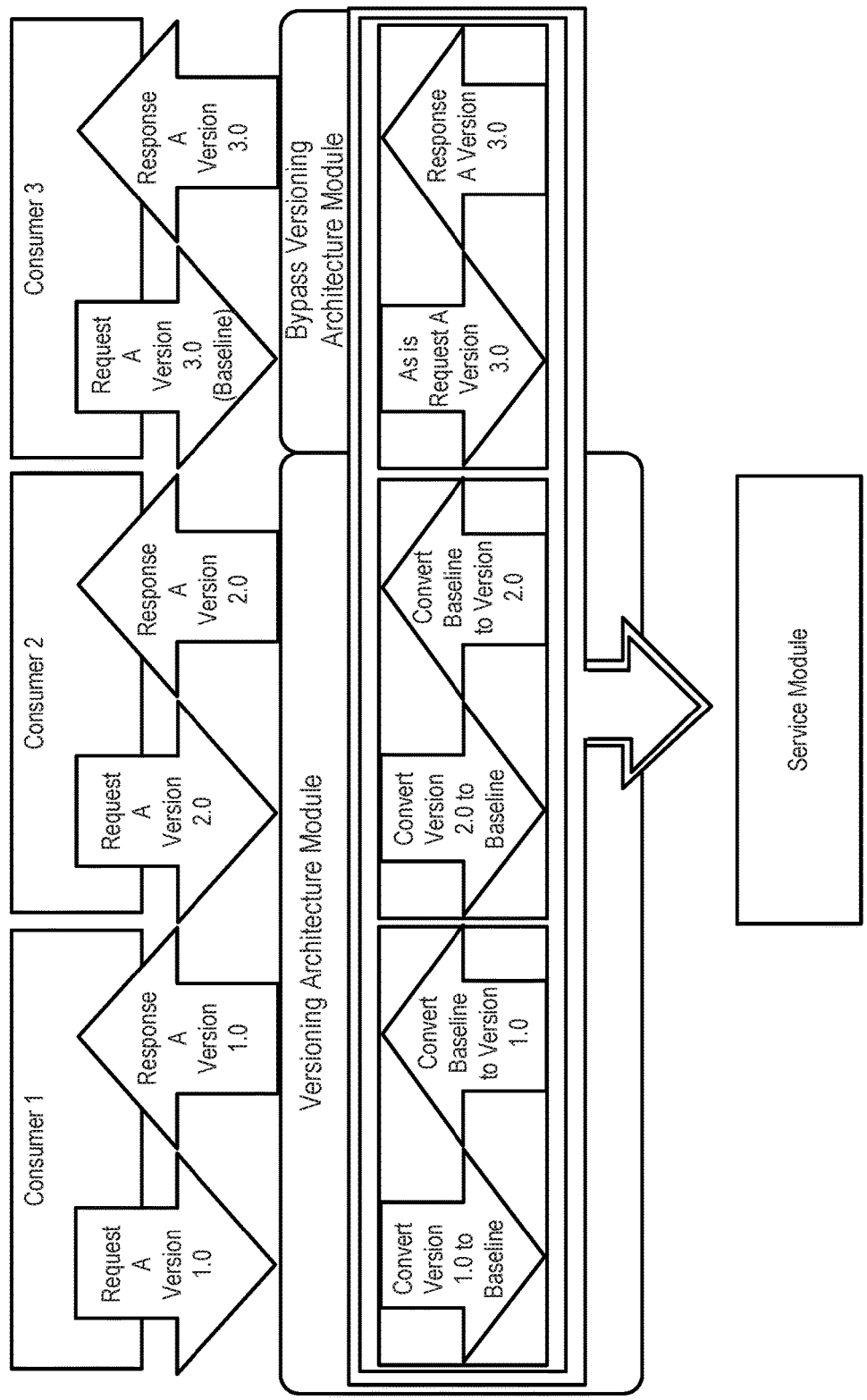
FIG. 4A illustrates an example service request having three different versions, in accordance with various embodiments.

In various embodiments, and with reference to FIG. 4A, an example service request data flow is illustrated. As an example, the service request may comprise three versions: 1.0, 2.0, and 3.0. The baseline request format may be in version 3.0. Consumer 1, consumer 2, and consumer 3 each may send the service request to service request system 110. Consumer 1 may send the service request having the service version request format of 1.0 and the service version response format of 1.0. Consumer 2 may send the service request having the service version request format of 2.0, and the service version response format of 2.0. Consumer 3 may send the service request having the service version request format of 3.0 and the service version response format of 3.0.

Consumer 1's service request may not be in the baseline request format, and may be reformatted by the versioning architecture module before being sent to the service module. Consumer 1's service request response may not be in the baseline response format, so the service request response may be sent to the versioning architecture module for reformatting before being sent back to consumer 1. Consumer 2's service request may not be in the baseline request format, and may be reformatted by the versioning architecture module before being sent to the service module. Consumer 2's service request response may not be in the baseline response format, so the service request response may be sent to the versioning architecture module for reformatting before being sent back to consumer 2. Consumer 3's service request may be in the baseline request format, so the service request may be sent directly to the service module. Consumer 3's service request response may be in the baseline response format, so the service request response may be sent from the service module to the consumer 3 directly.

Figure 4B:
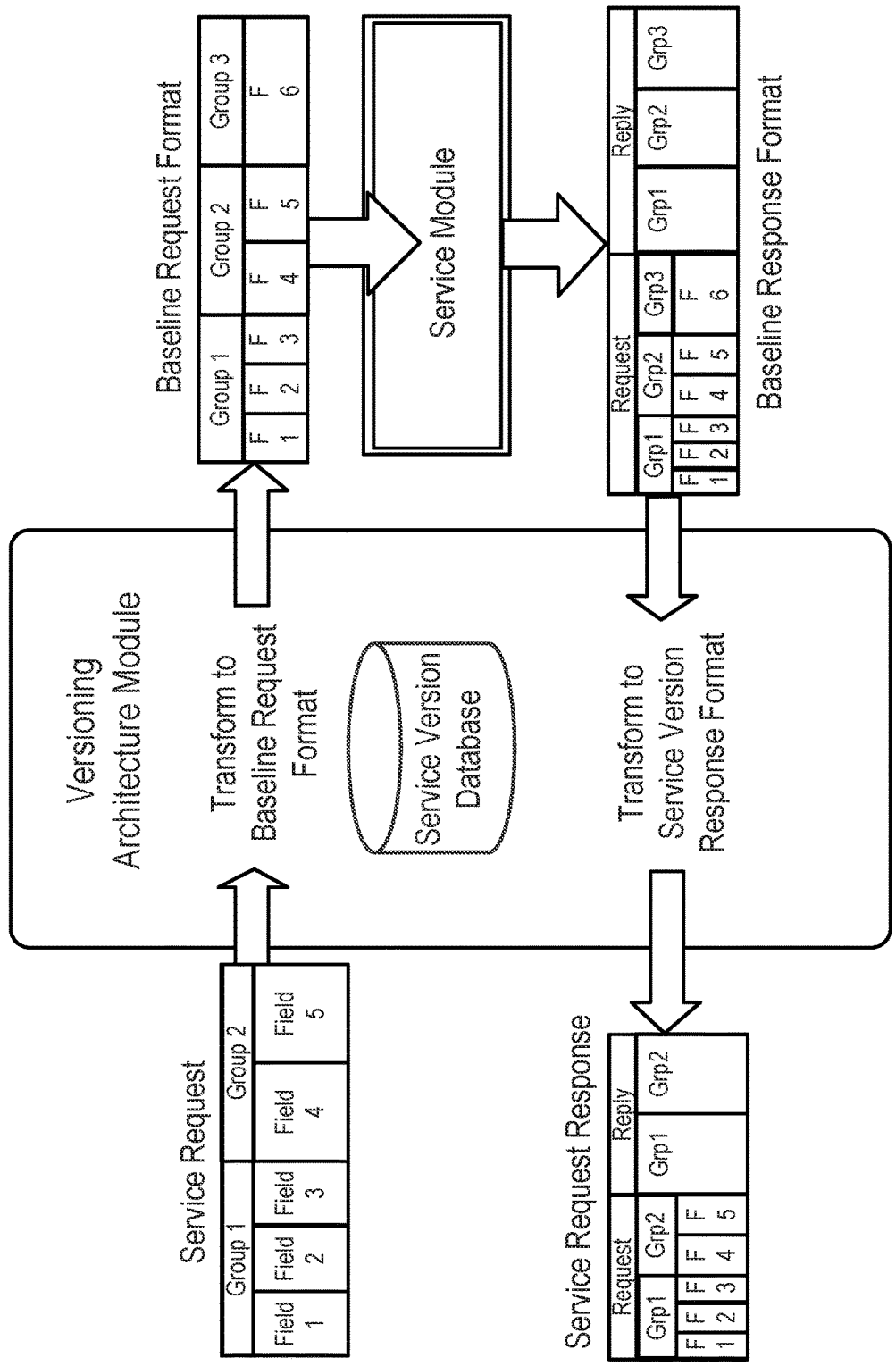
FIG. 4B illustrates an example service request wherein the service version request format and the service version response format are different than the baseline request format and the baseline response format, in accordance with various embodiments.

In various embodiments, and with reference to FIG. 4B, an example service request data flow is illustrated. In this example, the service request comprises two group IDs: Group1 and Group2. The baseline request format may comprise a third group ID, Group3. In response to the service request format not matching the baseline request format, the service request may be reformatted by the versioning architecture module. The service request may be reformatted by adding the Group3 group ID to the service request. The reformatted service request may be executed by the service module, and a service request response having a baseline response format may be generated. In response to the baseline response format not matching the service request response format, the service request response may be reformatted by the versioning architecture layer. The service request response may be reformatted by removing the Group3 group ID from the service request response. The reformatted service request response may be sent to the service requestor.

Figure 4C:
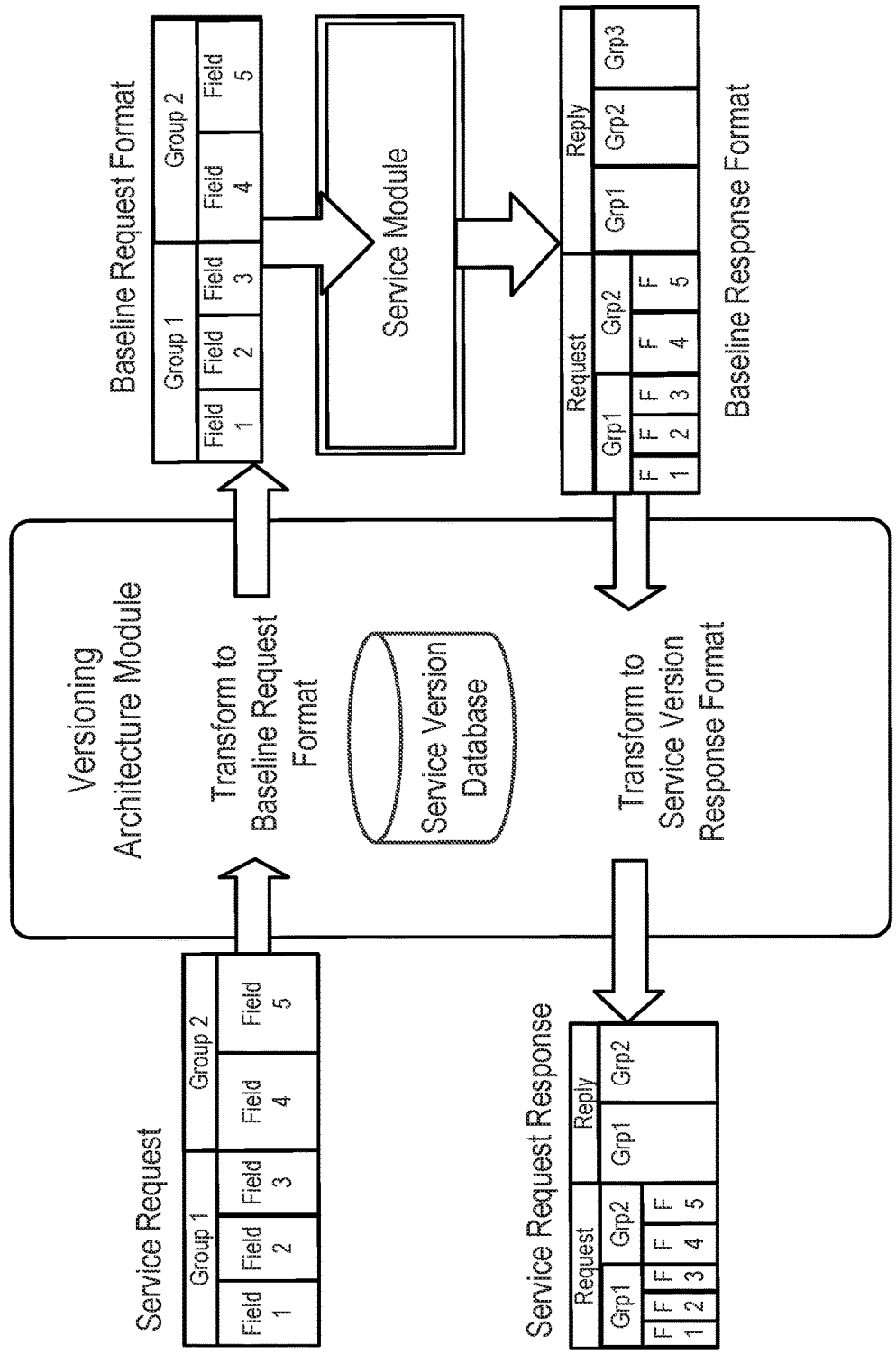
FIG. 4C illustrates an example service request wherein the service version response format is different than the baseline response format, in accordance with various embodiments.

In various embodiments, and with reference to FIG. 4C, an example service request data flow is illustrated. In this example, the service request format may match the baseline request format, but the service request response format may not match the baseline response format (the service request response format includes only the group IDs of Group1 and Group2, but the baseline response format includes a Group 3 group ID). In response to the baseline response format not matching the service request response format, the service request response may be reformatted by the versioning architecture layer. The service request response may be reformatted by removing the Group3 group ID from the service request response. The reformatted service request response may be sent to the service requestor.

Figure 4D:
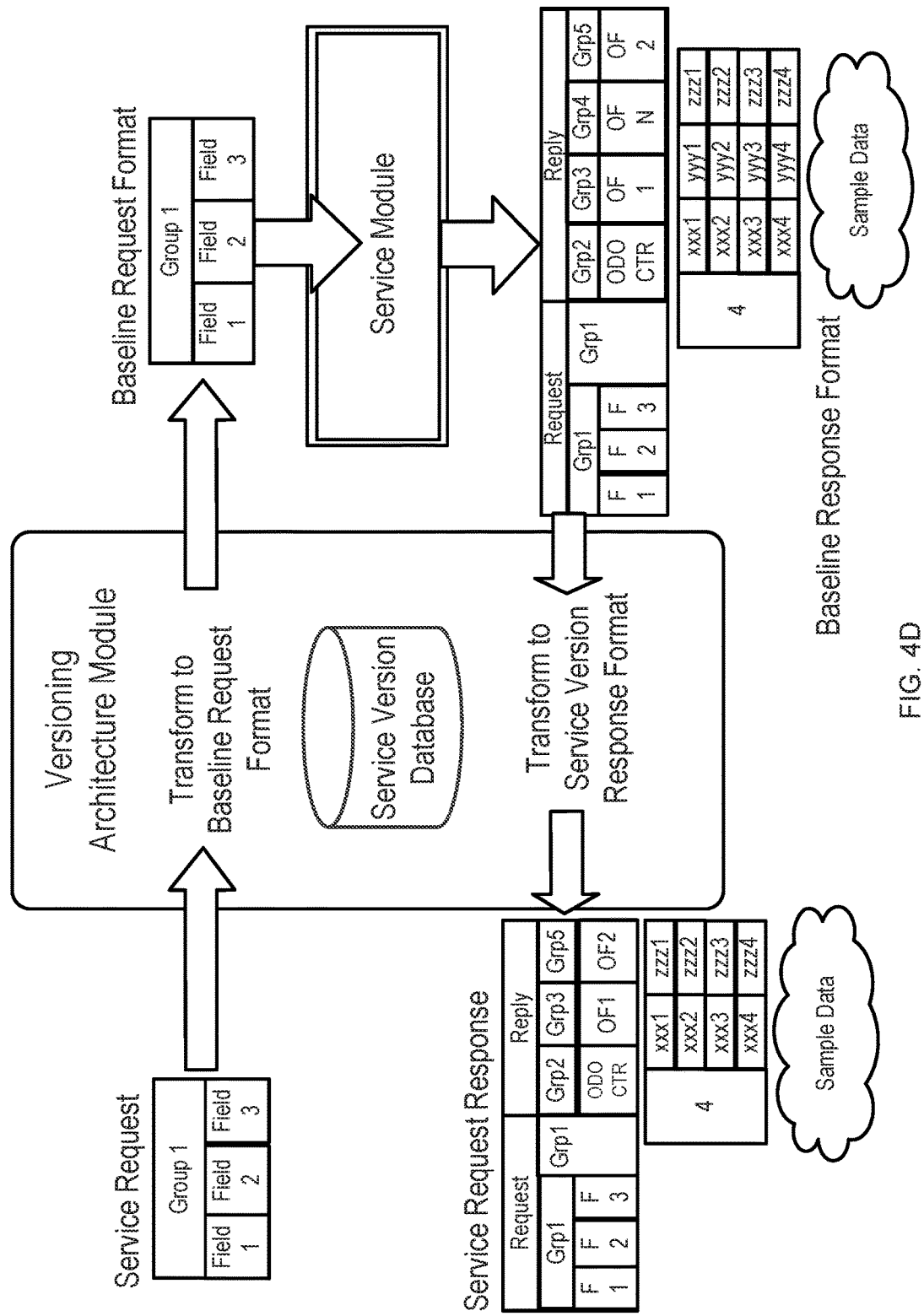
FIG. 4D illustrates an example service request wherein the service version response format is different than the baseline response format, in accordance with various embodiments.

In various embodiments, and with reference to FIG. 4D, an example service request data flow is illustrated. FIG. 4D may provide an example capability of the system to process and support COBOL (Common Business Oriented Language) occurs depending on (ODO) construct. Service request responses that contain ODO constructs may be handled by the system to convert the service request response from the baseline response format to the desired service version response format. In this example, the service request format may match the baseline request format, but the service request response format may not match the baseline response format. The service request response format comprises the group IDs Group 1, Group2, Group3, and Group 5, but does not comprise Group 4, which is included in the baseline response format. In response to the baseline response format not matching the service request response format, the service request response may be reformatted by the versioning architecture layer. The service request response may be reformatted by removing the Group4 group ID from the service request response. The reformatted service request response may be sent to the service requestor.

Figure 4E:
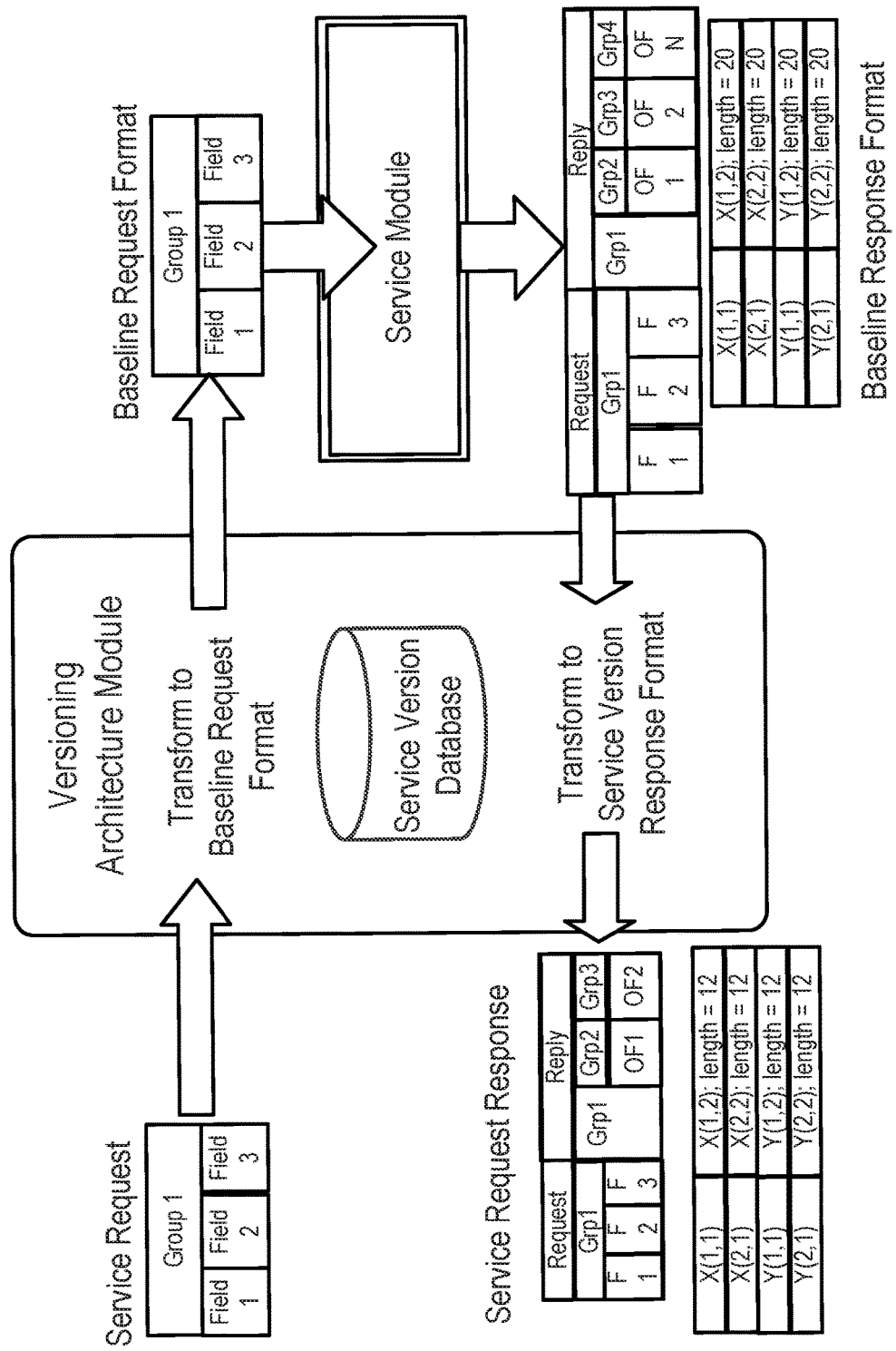
FIG. 4E illustrates an example service request wherein the service version response format is different than the baseline response format, in accordance with various embodiments.

In various embodiments, and with reference to FIG. 4E, an example service request data flow is illustrated. FIG. 4D may provide an example capability of the system to process and support a multi-dimensional array construct. Service request responses that contain multi-dimensional arrays may be handled by the system to convert the service request response from the baseline response format to the service version response format. In this example, the service request format matches the baseline request format, but the service request response format does not match the baseline response format. The service request response format comprises the group IDs Group 1, Group2, and Group3 but does not comprise Group 4, which is included in the baseline response format. Moreover, the baseline response format comprises an additional field in the second dimension. In response to the baseline response format not matching the service request response format, the service request response may be reformatted by the versioning architecture layer. The service request response may be reformatted by removing the Group4 group ID from the service request response, and removing the additional field in the second dimension. The reformatted service request response may be sent to the service requestor.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise a merchant website, a social media website, affiliate or partner websites, an external vendor, a mobile device communication, social media network and/or location based service. Distribution channels may include a merchant website, a social media site, affiliate or partner websites, an external vendor, and/or a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and/or the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, UNIX® OS, LINUX® OS, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a method of communication, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

As used herein, the term "end user", "consumer", "customer", "cardmember", "business", "merchant", or "financial institution" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same or different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:

receiving, by a processor of a computer based system in electronic communication with a service module, a service request,
  wherein the service request comprises a service version request format and a service version response format,
  wherein the service version request format comprises a first request group ID set comprising a first plurality of request group IDs, each first request group ID including a first data request field, and
  wherein the service version response format comprises a first response group ID set comprising a first plurality of response group IDs, each first response group ID including a first data response field;

retrieving, by the processor and via a service version database, a baseline request format and a baseline response format,
  wherein the baseline request format comprises a second request group ID set comprising a second plurality of request group IDs, each second request group ID including a second data request field, and
  wherein the baseline response format comprises a second response group ID set comprising a second plurality of response group IDs, each second response group ID including a second data response field;

comparing, by the processor and via a validation engine, the first request group ID set of the service version request format to the second request group ID set of the baseline request format to determine whether either comprises a request group ID that the other does not comprise;

reformatting, by the processor and via a versioning architecture module, the service request directly into the baseline request format, in response to the service version request format being different than the baseline request format,
  wherein the service request is reformatted by at least one of adding the request group ID from the baseline request format that is not comprised in the service version request format into the service request or removing the request group ID from the service version request format that is not comprised in the baseline request format from the service request;

retrieving, by the processor and via the service module, a data response entry from a records database by executing the service request reformatted into the baseline request format, wherein the data response entry is retrieved based on each of the second data request fields of the second request group ID set; and generating, by the processor and via the service module, a service request response,
  wherein the service request response comprises the data response entry and is formatted into the baseline response format.

2. The method of claim 1, further comprising:
comparing, by the processor and via the validation engine, the baseline response format to the service version response format;
reformatting, by the processor and via the versioning architecture module, the service request response directly into the service version response format, in response to the service version response format being different than the baseline response format; and
sending, by the processor, the service request response.

3. The method of claim 2, wherein the comparing the service version response format to the baseline response format comprises comparing the first response group ID set of the service version response format to the second response group ID set of the baseline response format to determine whether either comprises a response group ID that the other does not comprise.

4. The method of claim 3, wherein the reformatting the service request response into the service version response format comprises at least one of removing the response group ID from the baseline response format that is not comprised in the service version response format from the service request response or adding the response group ID from the service version response format that is not comprised in the baseline response format into the service request response, and wherein in response to the reformatting the service request response comprises only the response group IDs of the service version response format.

5. The method of claim 1, wherein the service request comprises an occurs depending on (ODO) construct.

6. The method of claim 1, wherein the service request comprises a multi-dimensional array construct.

7. The method of claim 1, wherein the baseline request format comprises a current version of the service request running on the service module.

8. A system comprising:
a processor; and
a tangible, non-transitory memory configured to communicate with the processor,
the tangible, non-transitory memory having instructions stored thereon that, in response to execution by the processor, cause the processor to perform operations comprising:
  receiving, by the processor in electronic communication with a service module, a service request,
    wherein the service request comprises a service version request format and a service version response format,
    wherein the service version request format comprises a first request group ID set comprising a first plurality of request group IDs, each first request group ID including a first data request field, and
    wherein the service version response format comprises a first response group ID set comprising a first plurality of response group IDs, each first response group ID including a first data response field;
  retrieving, by the processor and via a service version database, a baseline request format and a baseline response format,
    wherein the baseline request format comprises a second request group ID set comprising a second plurality of request group IDs, each second request group ID including a second data request field, and
    wherein the baseline response format comprises a second response group ID set comprising a second plurality of response group IDs, each second response group ID including a second data response field;
  comparing, by the processor and via a validation engine, the first request group ID set of the service version request format to the second request group ID set of the baseline request format to determine whether either comprises a request group ID that the other does not comprise;
  reformatting, by the processor and via a versioning architecture module, the service request directly into the baseline request format, in response to the service version request format being different than the baseline request format,
    wherein the service request is reformatted by at least one of adding the request group ID from the baseline request format that is not comprised in the service version request format into the service request or removing the request group ID from the service version request format that is not comprised in the baseline request format from the service request;
  retrieving, by the processor and via the service module, a data response entry from a records database by executing the service request reformatted into the baseline request format, wherein the data response entry is retrieved based on each of the second data request fields of the second request group ID set; and
  generating, by the processor and via the service module, a service request response,
    wherein the service request response comprises the data response entry and is formatted into the baseline response format.

9. The system of claim 8, wherein the operations further comprise:
comparing, by the processor and via the validation engine, the baseline response format to the service version response format;
reformatting, by the processor and via the versioning architecture module, the service request response directly into the service version response format, in response to the service version response format being different than the baseline response format; and
sending, by the processor, the service request response.

10. The system of claim 9, wherein the comparing the service version response format to the baseline response format comprises comparing the first response group ID set of the service version response format to the second response group ID set of the baseline response format to determine whether either comprises a response group ID that the other does not comprise.

11. The system of claim 10, wherein the reformatting the service request response into the service version response format comprises at least one of removing the response group ID from the baseline response format that is not comprised in the service version response format from the service request response or adding the response group ID from the service version response format that is not comprised in the baseline response format into the service request response, and wherein in response to the reformatting the service request response comprises only the response group IDs of the service version response format.

12. The system of claim 8, wherein the service request comprises a occurs depending on (ODO) construct.

13. The system of claim 8, wherein the service request comprises a multi-dimensional array construct.

14. The system of claim 8, wherein the baseline request format comprises a current version of the service request running on the service module.

15. An article of manufacture including a non-transitory, tangible computer readable storage medium having instructions stored thereon that, in response to execution by a processor, cause the processor to perform operations comprising:
receiving, by the processor in electronic communication with a service module, a service request,
wherein the service request comprises a service version request format and a service version response format,
wherein the service version request format comprises a first request group ID set comprising a first plurality of request group IDs, each first request group ID including a first data request field, and
wherein the service version response format comprises a first response group ID set comprising a first plurality of response group IDs, each first response group ID including a first data response field;
retrieving, by the processor and via a service version database, a baseline request format and a baseline response format,
wherein the baseline request format comprises a second request group ID set comprising a second plurality of request group IDs, each second request group ID including a second data request field, and
wherein the baseline response format comprises a second response group ID set comprising a second plurality of response group IDs, each second response group ID including a second data response field;
comparing, by the processor and via a validation engine, the first request group ID set of the service version request format to the second request group ID set of the baseline request format to determine whether either comprises a request group ID that the other does not comprise;
reformatting, by the processor and via a versioning architecture module, the service request directly into the baseline request format, in response to the service version request format being different than the baseline request format,
wherein the service request is reformatted by at least one of adding the request group ID from the baseline request format that is not comprised in the service version request format into the service request or removing the request group ID from the service version request format that is not comprised in the baseline request format from the service request;
retrieving, by the processor and via the service module, a data response entry from a records database by executing the service request reformatted into the baseline request format, wherein the data response entry is retrieved based on each of the second data request fields of the second request group ID set; and
generating, by the processor and via the service module, a service request response,
wherein the service request response comprises the data response entry and is formatted into the baseline response format.

16. The article of manufacture of claim 15, wherein the operations further comprise:
comparing, by the processor and via the validation engine, the baseline response format to the service version response format;
reformatting, by the processor and via the versioning architecture module, the service request response directly into the service version response format in response to the service version response format being different than the baseline response format; and
sending, by the processor, the service request response.

17. The article of manufacture of claim 16, wherein the comparing the service version response format to the baseline response format comprises comparing the first response group ID set of the service version response format to the second response group ID set of the baseline response format to determine whether either comprises a response group ID that the other does not comprise.

18. The article of manufacture of claim 15, wherein the service request comprises a occurs depending on (ODO) construct.

19. The article of manufacture of claim 15, wherein the service request comprises a multi-dimensional array construct.

20. The article of manufacture of claim 15, wherein the baseline request format comprises a current version of the service request running on the service module.

* * * * *